(12) United States Patent
Dunn

(10) Patent No.: US 7,269,853 B1
(45) Date of Patent: Sep. 11, 2007

(54) PRIVACY POLICY CHANGE NOTIFICATION

(75) Inventor: Melissa W. Dunn, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 845 days.

(21) Appl. No.: 10/625,884

(22) Filed: Jul. 23, 2003

(51) Int. Cl.
*H04L 29/00* (2006.01)

(52) U.S. Cl. ........................................... 726/27

(58) Field of Classification Search ................ 726/17, 726/21, 28, 29, 30
See application file for complete search history.

(56) References Cited

U.S. PATENT DOCUMENTS

| | | | |
|---|---|---|---|
| 5,544,322 A | 8/1996 | Cheng et al. | |
| 6,064,666 A | 5/2000 | Willner et al. | |
| 6,275,944 B1 | 8/2001 | Kao et al. | |
| 6,381,579 B1 | 4/2002 | Gervais et al. | |
| 6,463,533 B1 | 10/2002 | Calamera et al. | |
| 6,466,932 B1 | 10/2002 | Dennis et al. | |
| 6,480,850 B1* | 11/2002 | Veldhuisen | 707/9 |
| 7,072,886 B2* | 7/2006 | Salmenkaita et al. | 707/4 |
| 2002/0023059 A1 | 2/2002 | Bari et al. | |
| 2002/0104015 A1* | 8/2002 | Barzilai et al. | 713/201 |
| 2002/0129221 A1* | 9/2002 | Borgia et al. | 712/1 |
| 2003/0023451 A1* | 1/2003 | Willner et al. | 705/1 |
| 2003/0097451 A1 | 5/2003 | Bjorksten et al. | |
| 2004/0044628 A1* | 3/2004 | Mathew et al. | 705/51 |
| 2004/0083243 A1* | 4/2004 | Feng et al. | 707/203 |
| 2004/0133454 A1* | 7/2004 | Desio | 705/2 |
| 2005/0076233 A1* | 4/2005 | Aarts et al. | 713/201 |
| 2005/0240622 A1 | 10/2005 | Cheung | |

OTHER PUBLICATIONS

Grover et al., "E-Commerce and the Information Market," Communications of the ACM, Apr. 2001, vol. 44, Issue 4, ACM Press, New York, U.S.A.

* cited by examiner

*Primary Examiner*—Matthew B Smithers
(74) *Attorney, Agent, or Firm*—Senniger Powers

(57) ABSTRACT

Methods and system for managing consent. Embodiments of the invention identify a user in connection with an application or service that requests to use selected information associated with the user according to a predefined policy. After determining whether the user previously granted permission to use the selected information according to the policy, the invention can notify the user if a change has been made to the policy since the user previously granted permission for the application to use the selected information and obtain re-consent. Other aspects of the invention are directed to computer-readable media for use with authentication, notification, and re-consent.

45 Claims, 15 Drawing Sheets

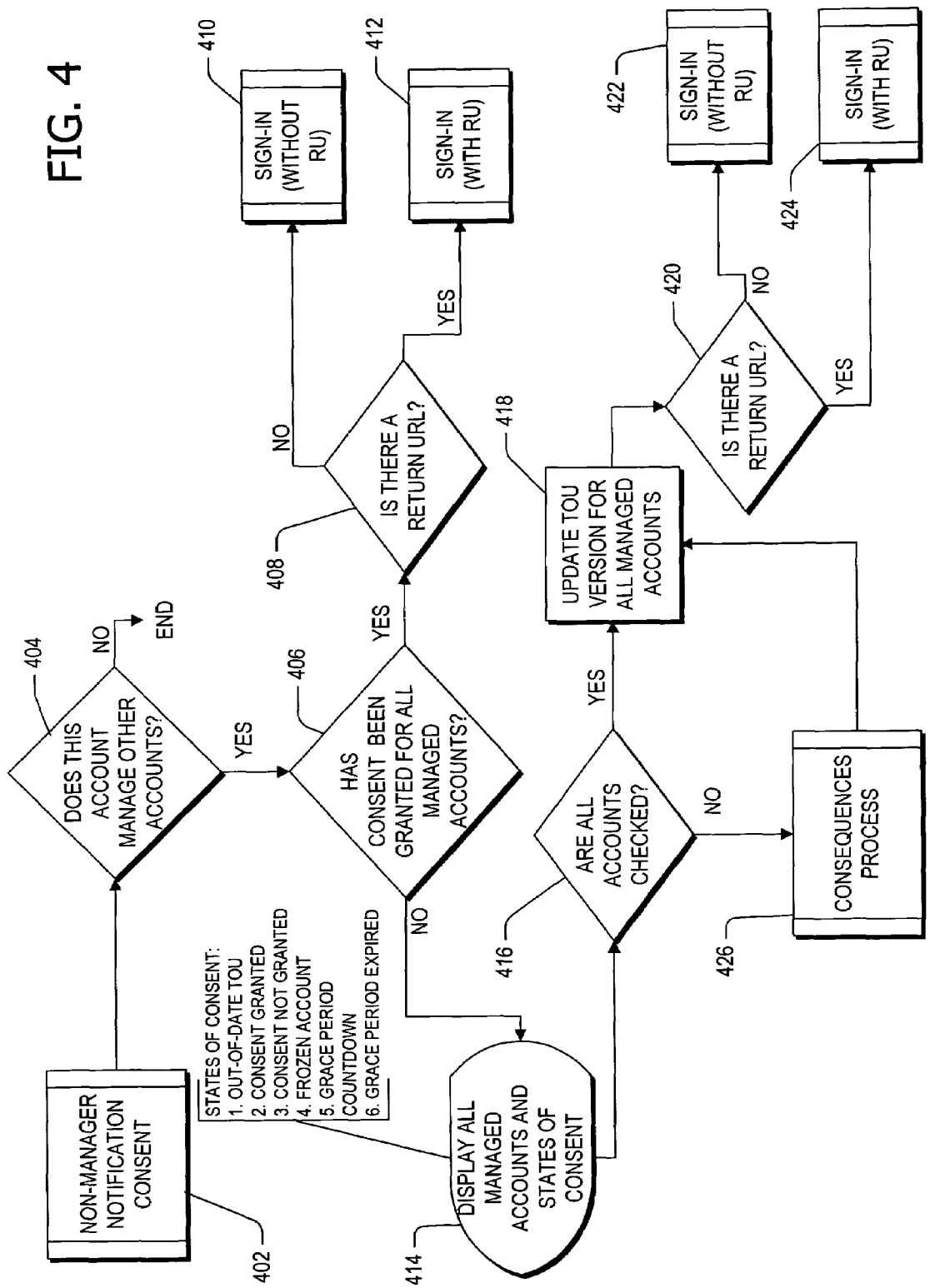

FIG. 7A

HELP | SIGN OUT

YOU ARE SIGNED IN AS username@A.com

SEE ALSO

⇑ PRIVACY POLICY
⇑ VIEW YOUR PER-SITE CONSENT SETTINGS
⇑ CHANGE YOUR PROFILE INFORMATION

SHARE PROFILE INFORMATION WITH SERVICE A

BEFORE YOU SIGN IN, WE NEED YOUR CONSENT TO SHARE INFORMATION FROM YOUR USER PROFILE WITH SERVICE A. SERVICE A NEEDS THIS INFORMATION TO SHOW YOU LOCAL INFORMATION AND PERSONALIZED CONTENT. MEMBER SERVICES MAY ALSO USE THIS INFORMATION TO:
- BETTER MATCH ITS CONTENT AND SERVICES TO YOUR INTERESTS.
- INFORM OTHER SITES ABOUT YOU, AS STATED IN SERVICE A'S *PRIVACY POLICY*.

TO SIGN IN TO SERVICE A, YOU MUST CONSENT TO LET US SHARE THE INFORMATION THAT SERVICE A REQUIRES. WE WILL AUTOMATICALLY SHARE THIS INFORMATION EACH TIME YOU SIGN IN TO SERVICE A. IF YOU WANT TO SHARE ADDITIONAL INFORMATION, CLICK YES NEXT TO THE OPTIONAL ITEMS BELOW. WE AUTOMATICALLY SAVE ANY CHANGES YOU MAKE IN YOUR PROFILE AND IN YOUR *CONSENT HISTORY* FOR SERVICE A.

| PERSONAL INFORMATION | FIRST NAME | MICHAEL | *WILL BE SHARED* |
| | LAST NAME | | *WILL BE SHARED* |
| | GENDER | MALE ○ FEMALE ○ | SHARE? YES ○ NO ⦿ |

| CONTACT INFORMATION | CONTACT E-MAIL | | *WILL BE SHARED* |

| LOCATION INFORMATION | ZIP CODE | | SHARE? |
| | COUNTRY/REGION | USA ▽ | YES ○ NO ⦿ |
| | STATE | WASHINGTON ▽ | YES ○ NO ⦿ |

CLICK CONTINUE TO AGREE TO SHARE THIS INFORMATION WITH SERVICE A. SERVICE A MAY STORE YOUR INFORMATION INDEFINITELY. YOU CAN CHANGE OR DENY CONSENT TO LET US SHARE YOUR INFORMATION WITH SERVICE A BY VISITING MEMBER SERVICES AT A.COM. EDITING YOUR PROFILE, OR CHANGING OR DENYING CONSENT FOR US TO SHARE INFORMATION AT A LATER TIME DOES NOT REQUIRE SERVICE A TO SAVE YOUR CHANGES OR DELETE INFORMATION THAT YOU'VE ALREADY SHARED.

[ CONTINUE ]  [ CANCEL ]

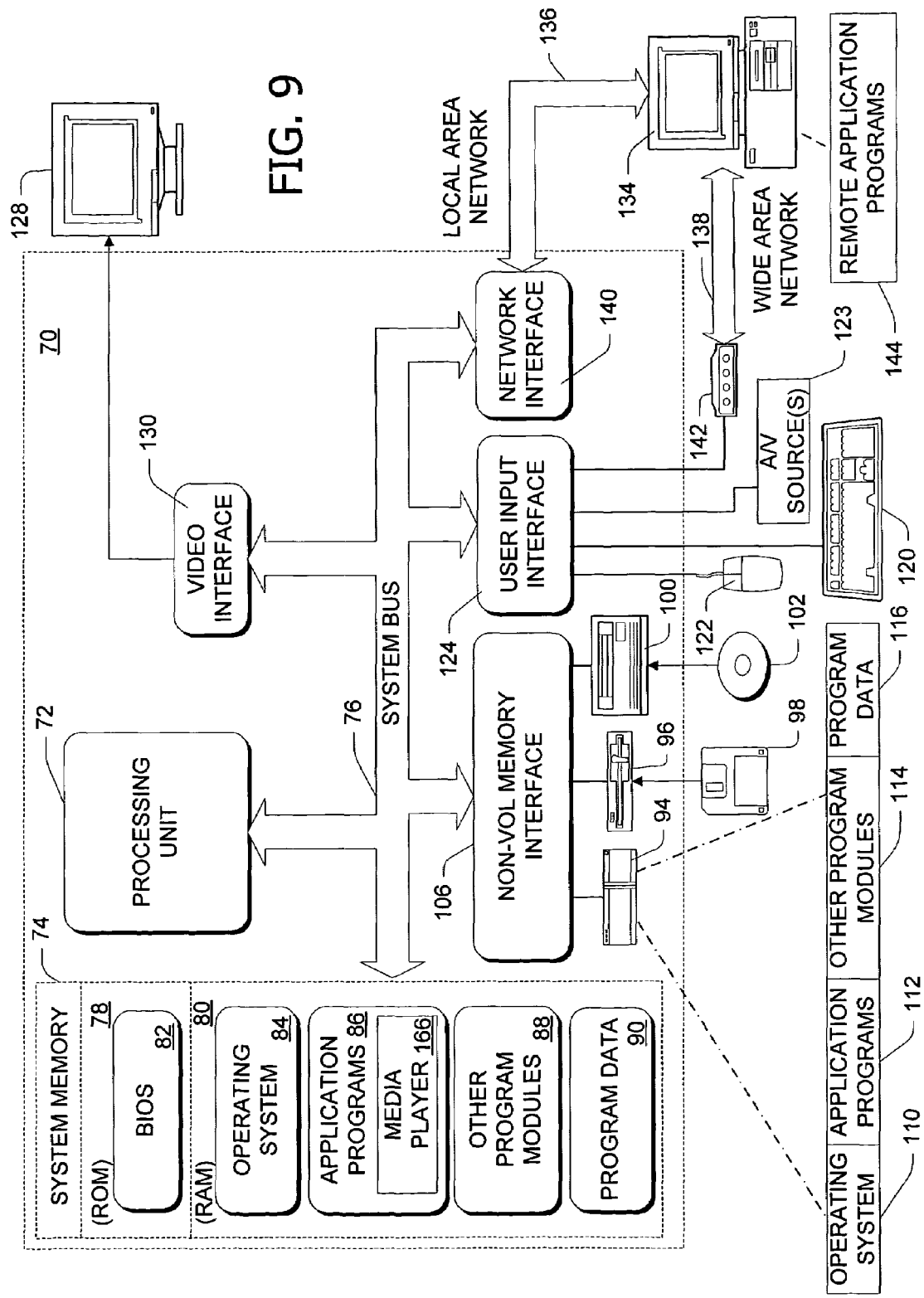

PRIVACY POLICY CHANGE NOTIFICATION

TECHNICAL FIELD

Embodiments of the present invention relate to the field of computer network environments. In particular, embodiments of this invention relate to easily notifying users of changes in privacy policies and obtaining permission to user information among related applications or sites that are affiliated with a multi-site user authentication system.

BACKGROUND OF THE INVENTION

Web sites, or Internet sites, very often provide information, products, services, and the like to their users. Many web sites require users to "register" before their web servers will grant access to the users. During registration, a user typically supplies personal information such as username, account number, address, telephone number, e-mail address, computer platform, age, gender, and/or hobbies to the registering web site. The registration information may be necessary to complete transactions (e.g., commercial or financial transactions). Typically, the information also permits the web site to contact the user directly (e.g., via electronic mail) to announce, for example, special promotions, new products, or new web site features. Additionally, web sites often collect user information so web site operators can better target future marketing activities or adjust the content provided by the sites.

When registering a user for the first time, a web site typically requests that the user select a login identifier, or login ID, and an associated password. The login ID allows the web site to identify the user and retrieve information about the user during subsequent user visits to the web site. Generally, the login ID must be unique to the web site such that no two users have the same login ID. The combination of the login ID and password associated with the login ID allows the web site to authenticate the user during subsequent visits to the web site. The password also prevents others (who do not know the password) from accessing the web site using the user's login ID. This password protection is particularly important if the web site stores private or confidential information about the user, such as financial information or medical records.

Using a presently available multi-site user authentication system (e.g., Microsoft®.NET™ Passport single sign-in service), a web user can maintain a single login ID (and associated password) for accessing multiple, affiliated web servers or services. Such a system permits the user to establish a unique account identified by, for example, an e-mail address.

Large Internet service providers often have many different web sites through which they offer services to consumers. Moreover, a single web service can actually be made up of many different content providers. For instance, ESPN® sports network is a premium service content provider with an MSN® Internet services subscription. Other sites may be used to provide content related to children's interests, e-shopping, news, and so forth. Consumers usually perceive these related sites as being essentially the same service. Further, as Internet usage migrates to a subscription-based model that includes content and services from a variety of different sites, the need exists for accurately sharing common information (e.g., billing and subscription information) between related sites.

As described above, a web site very often gathers personal information about its users for later use. A typical privacy statement for a web site describes how the site protects and uses personal information. The policy will likely specify first what information the site collects. For example, the site may maintain a profile for the user including information such as the user's e-mail address, first and last name, country or region, state or territory, ZIP code or postal code, language preference, time zone, gender, birth date, occupation, telephone number(s), credit card information, billing and shipping addresses, password, PIN, secret question and secret answer, clothing sizes, music preferences, and the like. Inasmuch as this profile information can be quite sensitive, the typical policy also specifies how the information will or will not be used. For example, a web site's privacy policy may forbid the site from selling or renting a user's personal information without prior consent. The same policy, however, may detail a number of permitted uses (e.g., resolving customer support inquiries, performing statistical analyses of the site's services, conforming to legal requirements, protecting the personal safety of users or the public). A typical policy often specifies certain circumstances under which disclosures or uses of information are permitted and those other circumstances under which they are not.

As the web becomes more tightly integrated across content and service providers, the ability to distinguish and thereby grant appropriate consent will become more difficult. Moreover, related sites may, but are not required to, have the same use policies, privacy policies, and/or ownership and may change their policies at any time. Users experience difficulty in managing the changing policies of different content providers. For example, agreeing to one privacy statement using a first time consent mechanism with one Internet service does not guarantee that the privacy policy will remain unchanged. Unfortunately, an end user today may not be notified when a web site/service or a client-side application, for instance, makes changes to its plans for using the user-provided profile information. Thus, the user is not aware that his or her information is now being used for purposes other than those originally agreed upon.

Accordingly, improved management of the consent process is desired to allow an end user to provide an informed consent to changes in privacy policies and the like.

SUMMARY OF THE INVENTION

Embodiments of the invention overcome one or more deficiencies in the prior art by providing, among other things, improved sharing of information and management of permissions. To promote informed consent, aspects of the invention notify the user of policy changes, present those changes in an understandable format, and ask the user to re-consent to the new information usage policy. According to one embodiment, the invention triggers the process of notification/re-consent at the time of authentication by a multi-site user authentication system. Moreover, the features of the present invention described herein are less laborious and easier to implement than currently available techniques as well as being economically feasible and commercially practical.

Briefly described, a method embodying aspects of the invention establishes permission to use information associated with a user. The method includes identifying the user in connection with an application that requests to use selected information associated with the user according to a pre-defined policy. The method also includes determining whether the user previously granted permission for the application to use the selected information according to the policy and notifying the user if a change has been made to the policy since the user previously granted permission for the application to use the selected information.

In another embodiment, a method of the invention manages consent between a client and at least one network server. The client and the network server are coupled to a data communication network. The network server provides one or more services to a user via the client, which operates a browser configured to permit the user to communicate on the data communication network. The method includes identifying the user in connection with the network server that requests to use selected information associated with the user according to a predefined policy. The method also includes defining a consent state associated with the identified user. The consent state directly corresponds to a version of the policy for which the user has granted permission for the network server to use the selected information. The method further includes identifying which version of the policy is currently in use for the network server and providing a user interface via the browser to notify the user when the version of the policy corresponding to the consent state is different from the version of the policy currently in use for the network server.

Yet another embodiment of the invention is directed to an authentication system that includes an authentication server coupled to a data communication network and an authentication database associated with the authentication server. The authentication database stores authentication information for comparison to login information provided by a user for authenticating the user. The authentication database further stores user-specific information that identifies the user with respect to one or more services provided by at least one affiliate server coupled to the data communication network. The affiliate server provides the one or more services to the user via a client coupled to the data communication network and requests to use selected information associated with the user according to a predefined policy. In this embodiment, the authentication server is configured to identify which version of the policy is currently in use for the affiliate server and to provide a user interface for notifying the user when the version of the policy currently in use is different from a policy under which the user previously granted permission for the affiliate server to use the selected information.

One or more computer-readable media have computer-executable components for managing consent between a client and at least one network server according to yet another embodiment of the invention. The client and the network server are coupled to a data communication network. The network server provides one or more services to a user via the client and requests to use selected information associated with the user according to a predefined policy. The computer-readable media includes an authentication component for authenticating the user and for identifying which version of the policy is currently in use for the network server. The media also includes a profiling component for determining whether the user previously granted permission for the network server to use the selected information and retrieves a consent state associated with the user. The consent state directly corresponds to a version of the policy for which the user has previously granted permission for the network server to use the selected information. The media also includes a re-consent component for notifying the user of one or more differences between the version of the policy currently in use for the network server and the version of the policy associated with the consent state and for requesting consent to the differences from the user.

Computer-readable media having computer-executable instructions for performing methods of sharing information embody further aspects of the invention.

Alternatively, the invention may comprise various other methods and apparatuses.

Other features will be in part apparent and in part pointed out hereinafter.

BRIEF DESCRIPTION OF THE DRAWINGS

FIG. 4 is an exemplary flow diagram illustrating yet further aspects of process flow according to one embodiment of the invention.

FIGS. 7A to 7E illustrate exemplary user interfaces for providing notice of policy changes and accepting re-consent.

FIG. 9 is a block diagram illustrating exemplary components of a computer for use in the system of FIG. 1.

Corresponding reference characters indicate corresponding parts throughout the drawings.

DETAILED DESCRIPTION OF THE INVENTION

Figure 1:
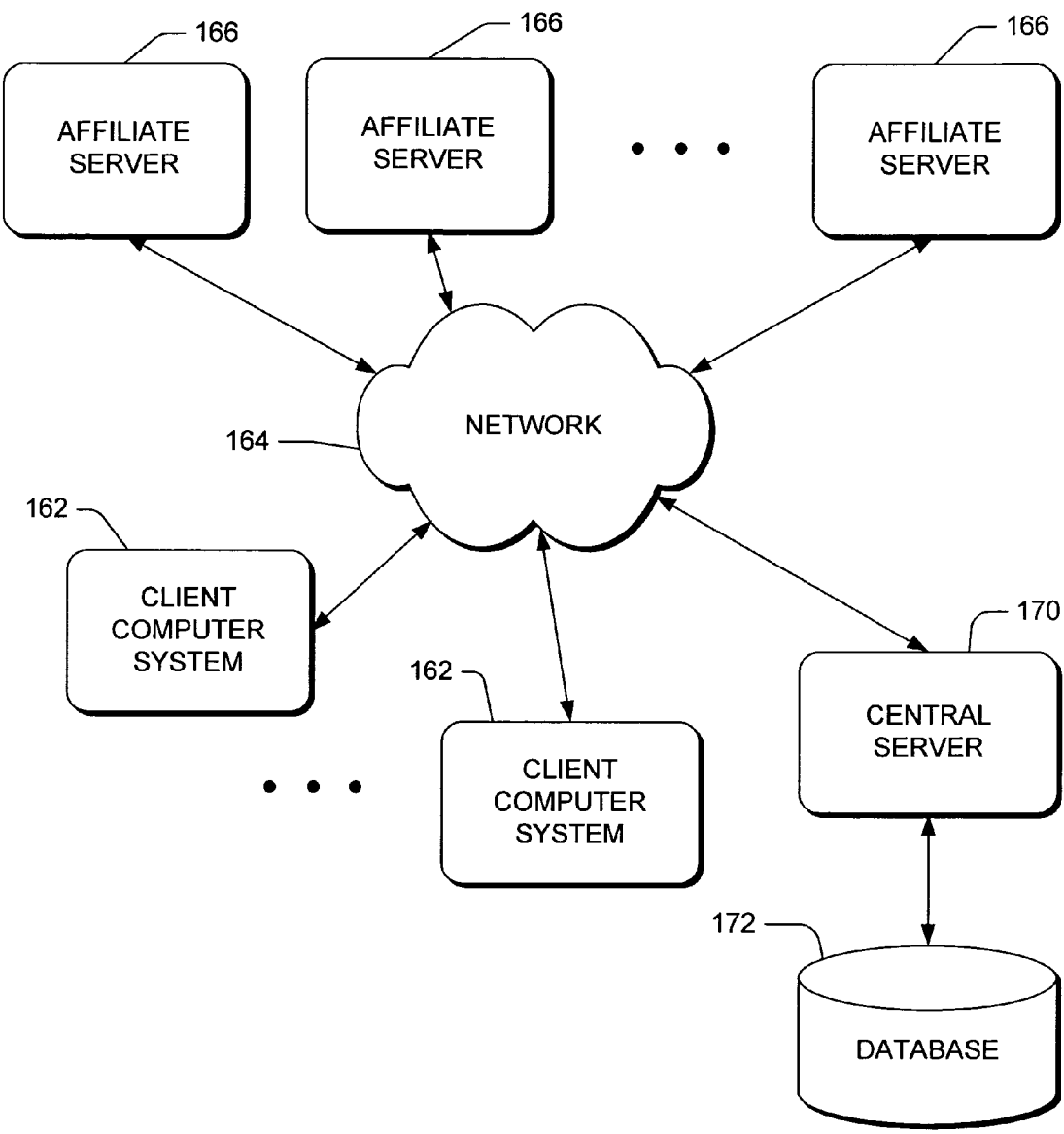
FIG. 1 is a block diagram illustrating an exemplary network environment in which the present invention may be utilized.

Referring now to the drawings, FIG. 1 illustrates an exemplary network environment in which the present invention may be utilized for managing permissions and user profile information. Embodiments of the invention relate to cross-internet collaboration between web sites as part of, for example, a distributed, multi-site user authentication system (e.g., Microsoft®.NET™ Passport sign-in service). Such services provide a user with the ability to access one or more participating web sites or resources with a single sign-in. Although the participating sites (referred to herein as "affiliates" or "affiliate sites") maintain control over permissions, they use the authentication service rather than hosting and maintaining their own proprietary authentication systems.

Those skilled in the art are familiar with the use of profiles for storing user-specific information. As a part of the single sign-in service, for example, the user can choose to store information in a user profile. Typical user profile information includes name, address, gender, occupation, preferred language, credit card information, billing address, shipping address, telephone numbers, and the like. At the user's option, the sign-in service makes all or part of the user profile information available to participating sites visited by the user. In one embodiment, the user is redirected from the sign-in service back to the desired affiliate site with an encrypted authentication ticket and profile information attached. This enables affiliate sites to customize and enhance user experience without having to prompt for information.

As described above, related sites may, but are not required to, have the same use policies, privacy policies, and/or ownership and may change their policies at any time. Users experience difficulty in managing the changing policies of different content providers. For example, agreeing to one privacy statement using a first time consent mechanism with one Internet service does not guarantee that the privacy policy will remain unchanged. An end user today is not notified when a web site/service or a client-side application, for instance, makes changes to the way it plans on using the user-provided profile information. Thus, the user is not aware that his or her information is now being used for purposes other than those originally agreed upon. The problem results because the end user is not asked to re-consent to the changes according to conventional practice.

Aspects of the present invention are related to notifying the user of policy changes, presenting the changes in an understandable format, and then asking the user to re-consent to the application's information usage policy. A change notification mechanism of the present invention allows applications, whether web or client-based, to present the end user with information regarding the changes in policy and provides the end user with the opportunity to re-consent to any usage of personal information by the application.

In FIG. 1, one or more client computer systems 162 are coupled to a data communication network 164. In this exemplary embodiment of the invention, the network 164 is the Internet (or the World Wide Web). However, the teachings of the present invention can be applied to any data communication network. Multiple affiliate servers 166 are also coupled to network 164. The affiliate servers 166 may be referred to as "web servers" or "network servers" generally.

A central server 170 coupled to network 164 allows communication between itself, client computer systems 162, and web servers 166. In operation, one or more client computer systems 162 can access affiliate servers 166 via network 164. Although sometimes referred to as an "authentication server" in connection with FIG. 1, the central server 170 in the illustrated embodiment is also a web server capable of interacting with web browsers and other web servers. In this example, server 170, client computer systems 162, and web servers 166 communicate data among themselves using the hypertext transfer protocol (HTTP), a protocol commonly used on the Internet to exchange information.

FIG. 1 further illustrates a database 172 coupled to server 170. In one embodiment, the database 172 contains information (i.e., credentials) necessary to authenticate a registered user of one of the client computer systems 162 (as well as other users on the network). The database 172 also maintains a profile store for registered users and identifies which elements of the user profile information should be provided to a particular affiliate server 166 when the user accesses its service. In general, a credential is a means for generating an authenticated reference to a single account identifier. For example, an EASI (E-mail As Sign-In) sign-in name and password, a mobile phone number and PIN, and a biometric signature are all credentials that can be associated with the same profile data. The sites/services of affiliated servers 166 may employ a common privacy statement of a hosting service or use entirely different policies.

Although database 172 is shown in FIG. 1 as a single storage unit separate from central server 170 for convenience, it is to be understood that in other embodiments of the invention, database 172 may be one or more memories contained within or separate from server 170. In a federated environment, for example, a plurality of servers 170 may be used to provide authentication, shared services management, policy and permissions management, and the like.

The server 170, as described herein, may be part of an authentication system that authenticates a user of client computer 162 seeking access to a particular one of the affiliate servers 166. In this embodiment, server 170 first requests authenticating login information from the user, such as the user's login ID and password. If the user is successfully authenticated, the server 170 of FIG. 1 routes the user's client computer 162 to the appropriate affiliate server 166 for performing a desired service for the user.

Prior to executing the authentication process, both the user of client computer system 162 and the operator(s) of affiliate servers 166 "register" with server 170. This registration is a one-time process that provides necessary information to the authentication system. According to one embodiment of the invention, this registration also provides the user with his or her first opportunity to grant consent for the sharing of certain personal information. The user of client computer system 162 registers with server 170 by providing information about the user and/or client computer system 162, such as, the user's name, mailing address, and e-mail address. As part of the user registration process, the user is assigned (or selects) a login ID, which is a common login ID, used to access any affiliate server (e.g., server 166). The login ID may also be referred to herein as a "username," "member name," or "login name".

Additionally, the user selects a password associated with the login ID that is used for authentication purposes. After registering and logging into server 170, the user can visit any affiliate server 166 (i.e., affiliate servers that are also registered with the same authentication server) without requiring any additional authentication and often without re-entering user information that is already contained in the associated user profile. The present invention sets forth identifying the user account, or profile, by a unique account identifier.

The central server 170 of FIG. 1, i.e., the authentication server in this embodiment, validates the username/password provided by the user. Server 170 handles the authentication response by comparing the login data to the entries in database 172. If the username and password match an entry in the database 172, the user is authenticated. A unique identifier (e.g., Passport Unique Identifier (PUID)) and a user profile corresponding to the authenticated user are extracted from the database. In this embodiment, when a user registers an account, the account is assigned a PUID that becomes the unique identifier for the account. The PUID is, for example, a 64-bit number that the authentication server sends (e.g., encrypted) to affiliate site 166 as the authentication credential when the user signs in. This unique identifier makes it possible for the site to determine whether the user is the same person from one sign-in session to the next.

Related sites or services are referred to herein as a "service group" or "shared services group" because they represent a group of independent sites IDs that together provide a user with a set of services. As an example, ESPN® sports network is a premium service content provider with an MSN® Internet services subscription. Shared services groups, however, need not employ the same policies regarding permissions. As used herein, "policy group" or "consent group" refers to a predefined group of sites (or applications generally) that have a shared permissions set, that is, they share a common set of permission standards (e.g., a common privacy policy).

Administrative groups support the scenarios in which a user who has authority over the authorization settings or permissions of one or more other users. Such groups include, for example, parents, managers, users who control multiple credentials, and domain space administrators. One of several administrative groups, a service group consists of site IDs representative of related sites on the network that work together to provide the user with a consistent set of services. Members of a service group, however, need not share the same privacy statement. When this is the case, the user typically consents to the sharing of user-provided data with each policy group represented within the service group. There should be a contractual arrangement providing the user with a known set of services.

One such situation is when a network of Internet services provides premium content through an affiliated site (e.g., Walt Disney Company and ESPN, Inc. currently provide premium content sites on the MSN® network of Internet services). Operational information that may be maintained by one site (e.g., MSN.com) but accessible to both the one site and another related site (e.g., MSN.com and Disney.com), indicates that the user has, for example, a premium content subscription. This information allows the user to move between content providers without having to re-authenticate or prove membership as a premium content subscriber. Further, multi-company corporations can be represented as a service group when they do not share a corporate privacy statement. This might be when a financial company owns both banks and insurance companies and it wants the user to be able to move between the different companies without having to re-authenticate or prove membership.

On the other hand, a policy group consists of sites/services that operate under a shared privacy or other permissions policy. The policy group, which is another form of administrative group, implements first time login consent scenarios. By grouping applications, such as particular web services, having the same policy, an embodiment of the invention allows a user to grant consent to share information with all members of the policy group the first time the user signs in to any member of the group. If a particular site does not share a privacy statement with any other site, then its site ID can be considered to be a policy group of one.

First time consent is a feature of a single sign-in service that allows the user to determine whether or not to share user profile information with participating sites/services. As an example, when a user navigates to a desired site for the first time, the site presents the user with its first time consent page indicating that it requires the user's non-identifying information and would like his or her e-mail address. In this instance, the multi-site user authentication service (i.e., central server 170) updates the user's profile and may perform a check for site membership in an administrative group. The authentication service writes consent information to the user profile indicating, for example, PUID, site ID and/or policy group ID as appropriate, agreed upon intentions, elements set to share, and retention policy. Finally, the authentication service in this example sends the selected and required information to the site.

According to one embodiment of the consent process, the first time the user navigates to a participating site/service to which the user has granted consent for use of the profile information, the user is shown a page containing information such as what the user will receive in exchange for the information, the secondary uses for the information (e.g., aggregated analysis), with whom the information will be shared, how long the information will be retained by the site/service, and whether the user will be able to access the information and make corrections as necessary. In essence, first time consent breaks down the participating site/service privacy policy into an easy to understand format. Exemplary profile elements include: "contact me at" e-mail address; first and last name; gender; birth date; country; language; occupation; city; state; and postal code.

Further to the foregoing example, a first time consent page (e.g., FIG. 7A) may be partially completed when the user navigates to an affiliated site for the first time. Advantageously, the first time consent page permits the user to correct any errors in the information, set which information is to be shared, and update his or her profile accordingly. In this instance, the authentication service of server 170 updates the user's profile in database 172 because the selected option explicitly requested this operation.

Often, the site at affiliate server 166 collects more information than is stored in the user profile associated with the multi-site authentication service of server 170. When the user signs in to the affiliate service for the first time, the invention in this example presents the user with the consent page indicating the service requires the user's location information and e-mail address. If the user does not want to share his or her real e-mail address with the service, the user can change the e-mail address and choose an option to always let the user choose and to not update the profile.

The descriptions of embodiments of the invention set forth herein refer to a re-consent process that accommodates changes to an application's information usage policy and which occurs after a suitable first time consent process.

Figure 2:
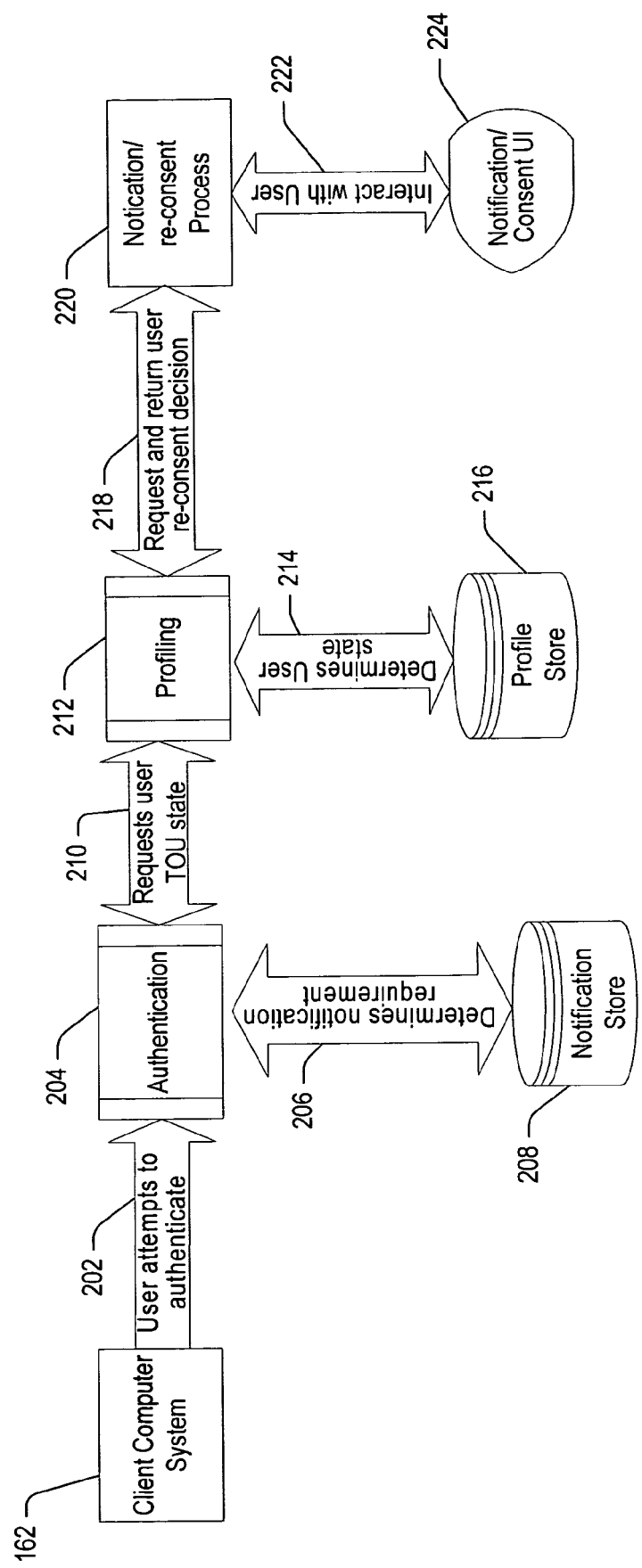
FIG. 2 is an exemplary flow diagram illustrating process flow according to one embodiment of the invention.

Referring now to FIG. 2, an exemplary flow diagram illustrates logical flow for change notification and re-consent according to an embodiment of the invention. Beginning at 202, the user signs in to a service or application using an authentication system as described herein. In this instance, central server 170 executes a predefined authentication process 204. Based on the user's unique identifier (e.g., a PUID), server 170 authenticates the user of client computer 162 seeking access to a particular one of the affiliate servers 166 (e.g., the network server providing a desired Service A). When performing an authentication, server 170 first requests authenticating login information from the user, such as the user's login ID and password.

In one embodiment, the user signs in to the single sign-in service at the participating affiliate site/service 166. A mechanism at the time of authentication triggers the process of notifying the user of policy changes and obtaining re-consent. If central server 170 determines that the user's account is not profile-enabled, however, operations may bypass the consent process because there is essentially no information to consent to share. Under usual circumstances, server 170 simply returns the user's associated PUID and any appropriate operational information to affiliate server 166. On the other hand, if the user is successfully authenticated and signed in, server 170 determines if a site ID for a particular service (or application) is on file and corresponding to the user. In particular, server 170 searches its associated database 172 for permissions or other consent information linked to the user ID and the site ID. In other words, after the user signs in to a site/service, the invention determines whether the specific site ID is listed with the user PUID as having been granted consent for the requested elements.

At 206, the authentication process 204 communicates with a notification store 208 according to embodiments of the present invention to determine whether the user should be notified of any policy changes. The notification store 208 contains notification elements, such as grace period start and end dates, change content, and current terms of use version number. Operations proceed to 210 where authentication process 204 requests information from a predefined profiling process 212 regarding the user's current TOU ("terms of use") state. The profiling process 212 in the illustrated embodiment determines the user consent state at 214 based on information stored in a profiling store 216. The profiling store 216 contains information about the user, such as last agreed to terms of use version number; date of the agreement; information regarding special circumstances under which not re-consenting could cause loss of services; and whether there is a manager/parent required for re-consent. It is to be understood that notification store 206 and/or profile store 216 may be embodied by database 172 associated with central server 170.

Proceeding to 218, profiling process 212 requests re-consent from the user for the changed policy. For example, the invention provides a mechanism for sending e-mail to affected users to alert them to the changes. In one embodiment, the e-mail provides a link to a notification process 220.

Referring further to FIG. 2, operational flow continues at 222 for providing user interface components that allow a consistent presentation of materials to the user via a display at 224. In response to the notification at 224, the user may choose to expressly re-consent to the changed policy, turn off the notification process, or implicitly grant consent. The user's re-consent decision is returned at 218.

Although described in the context of affiliated web sites/services, it is to be understood that the invention is applicable to applications generally, as represented by application values or IDs.

APPENDIX A provides an additional specific example of the notification and re-consent process.

FIG. 3 illustrates an exemplary operational flow for change notification and re-consent according to one embodiment of the invention. As described further below, FIG. 3 involves a user who is still within a grace period for granting consent to the changed policy. Beginning at 302, the user signs in from any sign-in point (e.g., Service A using an authentication system as described herein). Based on the user's unique identifier (e.g., a PUID), server 170 authenticates the user of client computer 162 seeking access to a particular one of the affiliate servers 166, namely, the network server providing Service A. When performing an authentication, server 170 first requests authenticating login information from the user, such as the user's login ID and password.

If the user is successfully authenticated and signed in at 302, server 170 proceeds to 304 where it is first determined that the user does not have a managed sign-in account. If the account is managed, re-consent is obtained from the manager. The invention in this example next determines at 306 which version of the policy, or TOU, applies to the user and whether this version is current. If the TOU version to which the user last granted consent is not the most current, then server 170 checks at 308 if the user previously requested to never be notified of policy changes. When it is determined that the "Never Notify Me" option (e.g., FIG. 7B) for silent consent is not taken, operations continue at 312. At 312, server 170 identifies whether the notification grace period is still in effect. If the grace period has not yet expired, a change notification user interface (UI) is exposed to the user at 314 (e.g., FIG. 7B).

Figure 3A:
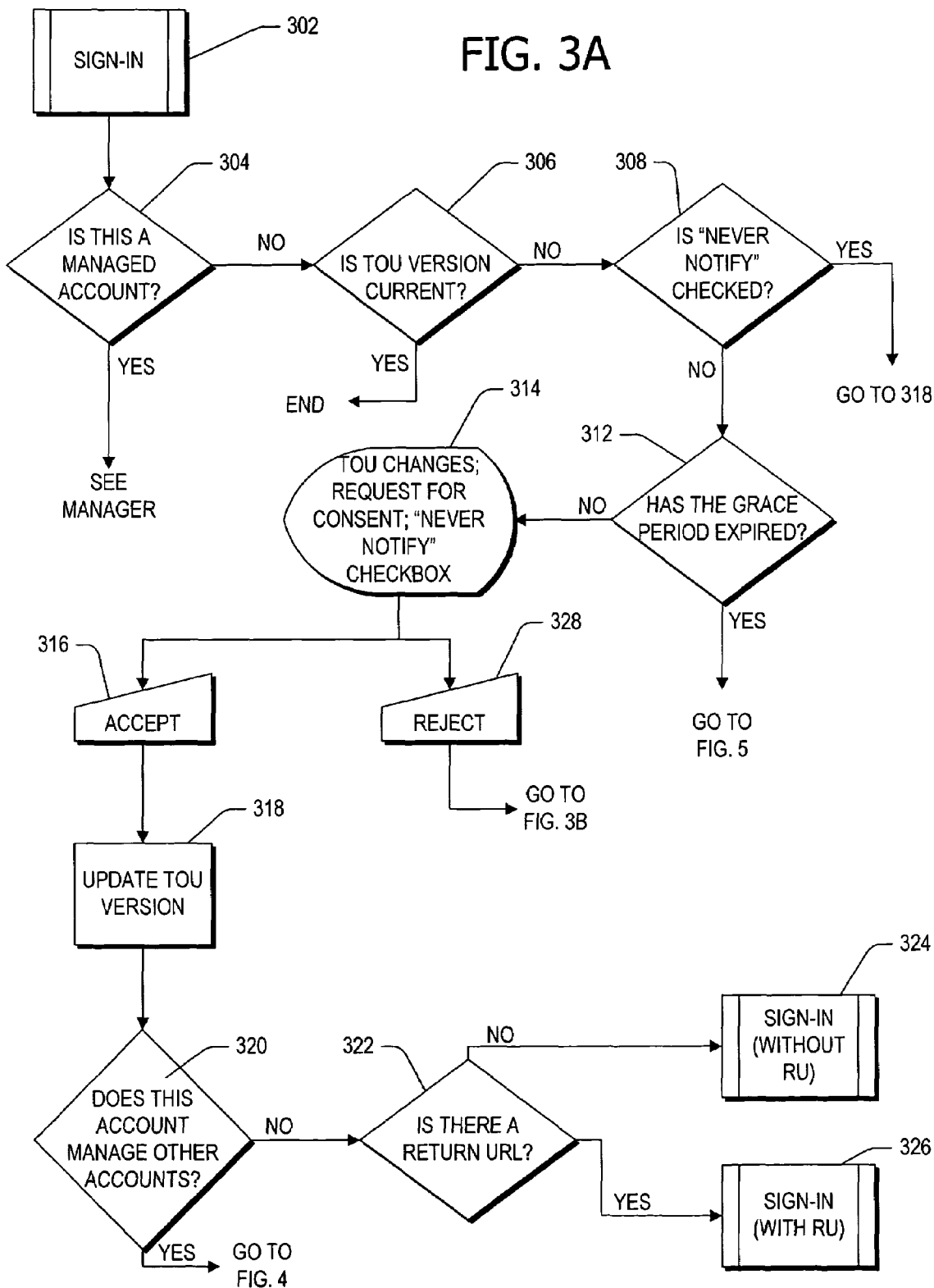
FIGS. 3A and 3B are exemplary flow diagrams illustrating further aspects of process flow according to one embodiment of the invention.

The change notification UI in the embodiment of FIG. 3A permits the user to either accept or reject the new terms of use. In an alternative embodiment, the UI notifies the user when the policy of the application does not match one or more policies associated with the information requested. If the user accepts the changes at 316, the invention updates the TOU version associated with the user at 318. Next in this example, it is determined at 320 whether the user manages any other sign-in service accounts. If so, FIG. 4 provides an exemplary flow diagram. If not, operations continue at 322 for returning the user to an appropriate destination, that is, either a sign-in UI without a return URL at 324 or a sign-in UI with a return URL at 326.

Further to the example, of FIG. 3A, when it is determined at 308 that the "Never Notify Me" option for silent consent is taken, operations proceed directly to 318 for updating the TOU version associated with the user.

Figure 3B:
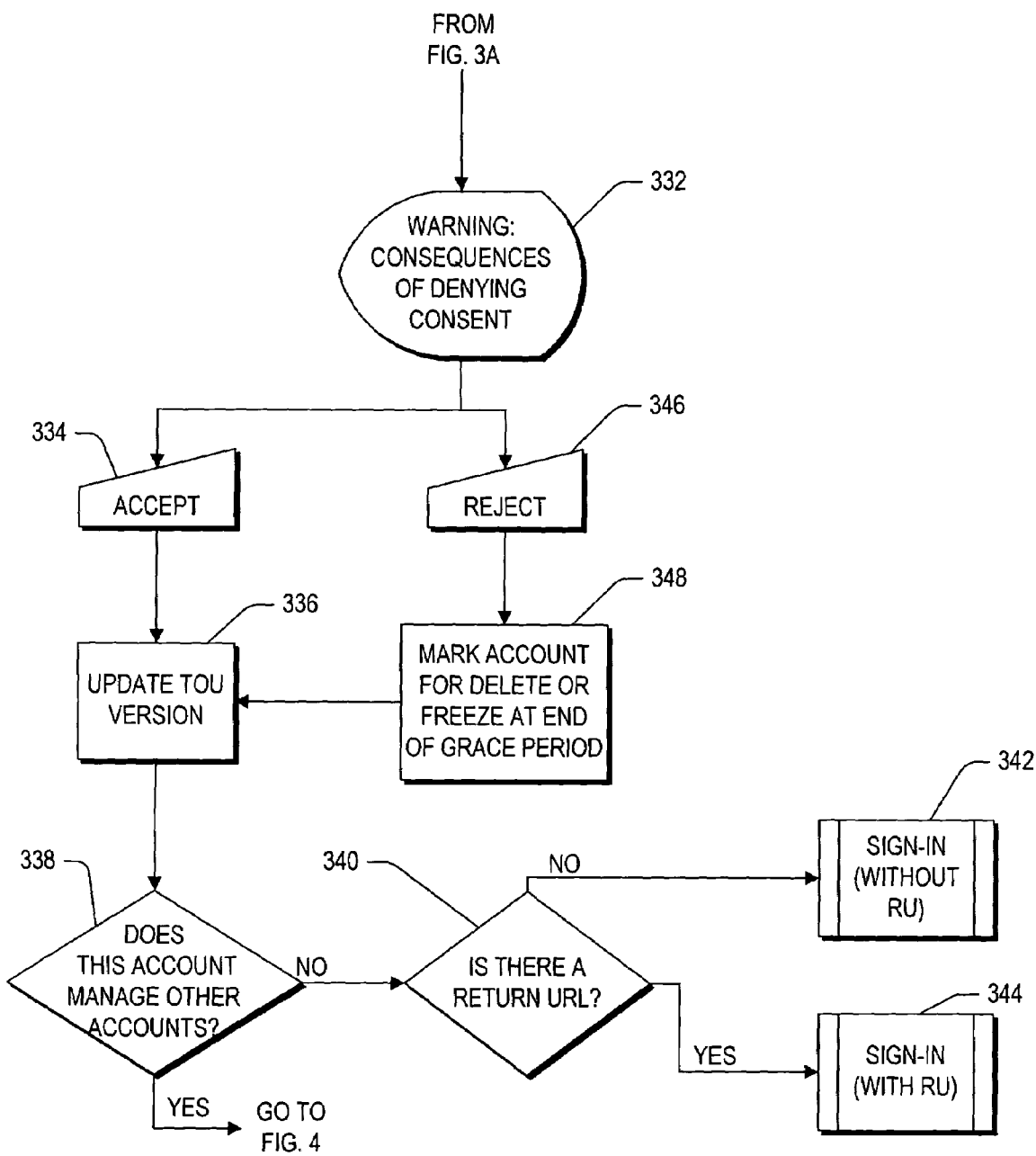

Referring further to the example of FIG. 3A, which involves an unmanaged account, operational flow continues as shown in FIG. 3B if the user chooses to reject the policy changes at 328. In FIG. 3B, the consequences of the denying consent depend on, among other things, whether any billing relationships exist between the user and the service provider. For example, the user may subscribe to (and possibly pay for) a premium content subscription further to his or her portal service subscription. When a billing relationship exists, merely denying the user access to the account for failure to consent to policy changes could be problematic. In one embodiment, the invention provides a UI to the user at 332 (e.g., FIG. 7D) explaining the consequences of denying consent to the changed terms of use. The content of the consequences page is determined by whether or not there is a billing relationship. Moreover, the effect on the user's account will depend on whether there is a known billing relationship.

Again, the consequences UI in the embodiment of FIG. 3B permits the user to either accept or reject the new terms of use. If the user accepts the changes at 334, the invention updates the TOU version associated with the user at 336. In addition, it is contemplated that the invention displays an acceptance confirmation page (e.g., FIG. 7C) to the user. Next in this example, it is determined at 338 whether the user manages any other sign-in service accounts. If so, FIG. 4 provides an exemplary flow diagram. If not, operations continue at 340 for returning the user to an appropriate destination, that is, either a sign-in UI without a return URL at 342 or a sign-in UI with a return URL at 344.

In FIG. 3B, if the user chooses to reject the policy changes at 346, operational flow proceeds to 348 for either marking the user's account for deletion or marking it for freezing. As described above, the effect on the user's account of denying consent depends on whether there is a known billing relationship. In one embodiment, the invention freezes the user's account if any billing relationships exist between the user and the service. In the absence of a billing relationship, the user's account is instead marked for deletion. Notwithstanding the user's billing relationship status, the invention updates the TOU version associated with the user at 336. In addition, one embodiment of the invention displays a rejection or denial confirmation page (e.g., FIG. 7E) to the user. The invention in another embodiment provides the ability to not allow applications (e.g., either web or local) to access profile information without user consent.

It is to be understood that the invention can also apply to a managed user account. Managers of user accounts include, for example, parents of minor users and corporate, governmental, or enterprise information systems managers. Managers provide registration management, reset passwords, set consent levels, and the like. FIG. 4 illustrates an exemplary operational flow for when the user is also a manager. If a minor user, for example, visits a site for the first time, central server 170 renders a request for a parent to sign in to the desired site/service on behalf of the minor. When the parent user signs in, the authentication service presents the parent with the first time consent page for the minor user and, operating in accordance with aspects of the invention, the authentication service further provides for change notification and re-consent via the manager. When the user is also a manager, the accounts will follow through the same consequences paths as for the manager himself. Thus, in this embodiment the accounts will be frozen if there is a billing relationship and marked for deletion if there is no billing relationship. FIG. 4 shows an embodiment in which there is a consequences page displayed and does not necessarily duplicate the paths described above.

In FIG. 4, operations continue from a non-manager notification consent process at 402 (e.g., FIGS. 3A and 3B). Proceeding to 404, it is determined whether the user's sign-in service account manages one or more other accounts. If so, this embodiment of the invention checks at 406 if consent has already been granted for the managed accounts through the change notification process. Operations continue at 408 for returning the user to an appropriate destination, that is, either a sign-in UI without a return URL at 410 or a sign-in UI with a return URL at 412.

On the other hand, a user interface at 414 displays, for example, names and states of consent to the user. Exemplary states of consent relate to an out-of-date TOU, granted consent, denied consent, a frozen account, an account within a grace period, and an account having an expired grace period. The user can choose to accept or reject the policy changes, similarly to a non-managed account, on behalf of each managed account. If the user/manager accepts all accounts at 416, then the invention in this embodiment shows an acceptance confirmation page that lists all accounts and their new consent state and updates the TOU version associated with the managed user accounts at 418. In this instance, the invention checks at 420 if there is a return URL and returns the user to an appropriate destination, that is, either a sign-in UI without a return URL at 422 or a sign-in UI with a return URL at 424.

At 426, the exemplary flow diagram of FIG. 4 provides a consequences process according to embodiments of the invention. If the user/manager rejects the new terms of use for any account, then the known billing relationship state is used to determine the consequences page. If the user/manager continues to reject the changes, then the selected managed accounts are marked to be either frozen or deleted based upon the known billing relationship state. The present invention may also present the user/manager with a page showing the new consent states for the managed accounts.

Figure 5A:
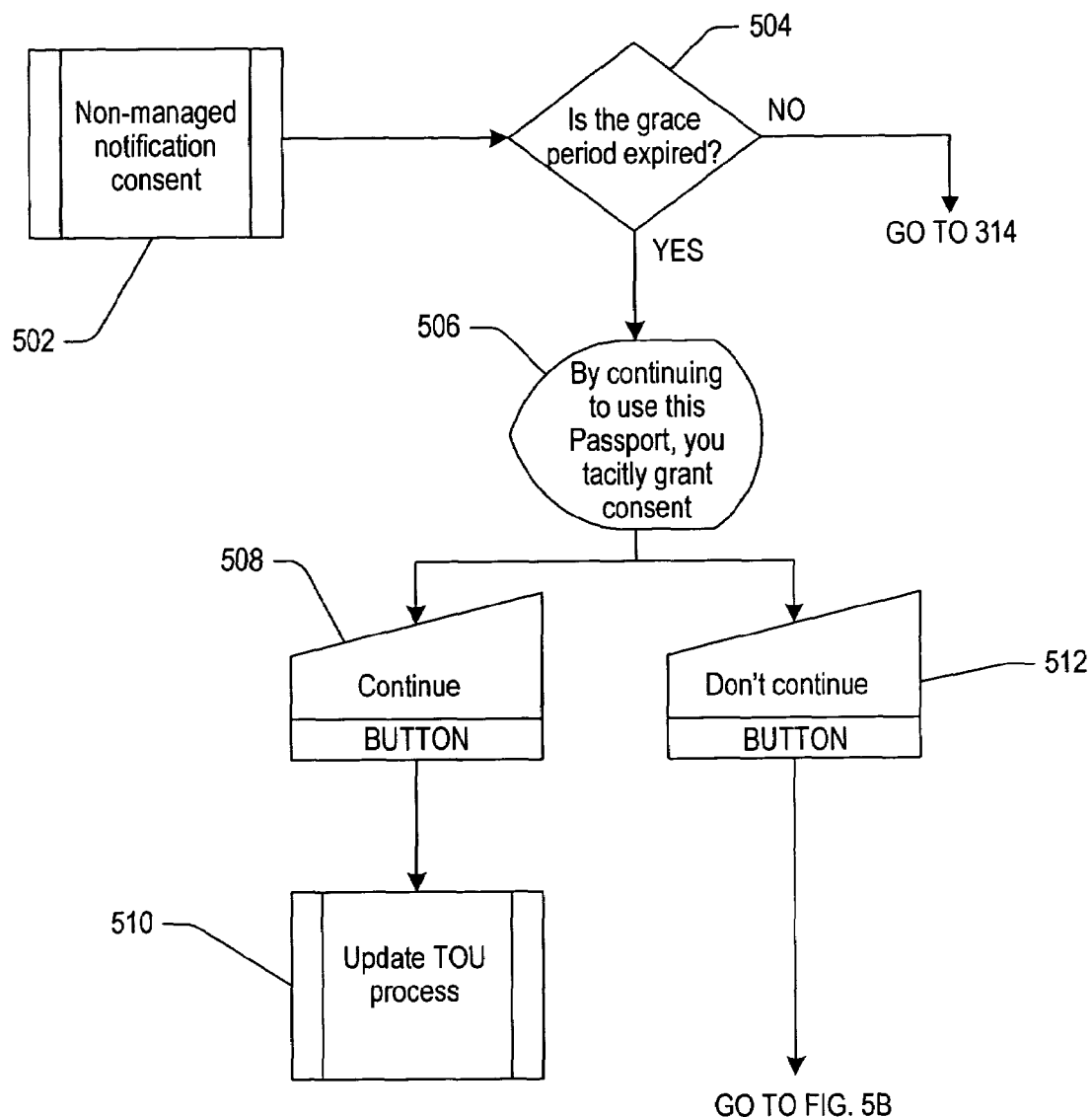
FIGS. 5A and 5B are exemplary flow diagrams illustrating yet further aspects of process flow according to one embodiment of the invention.
Figure 5B:
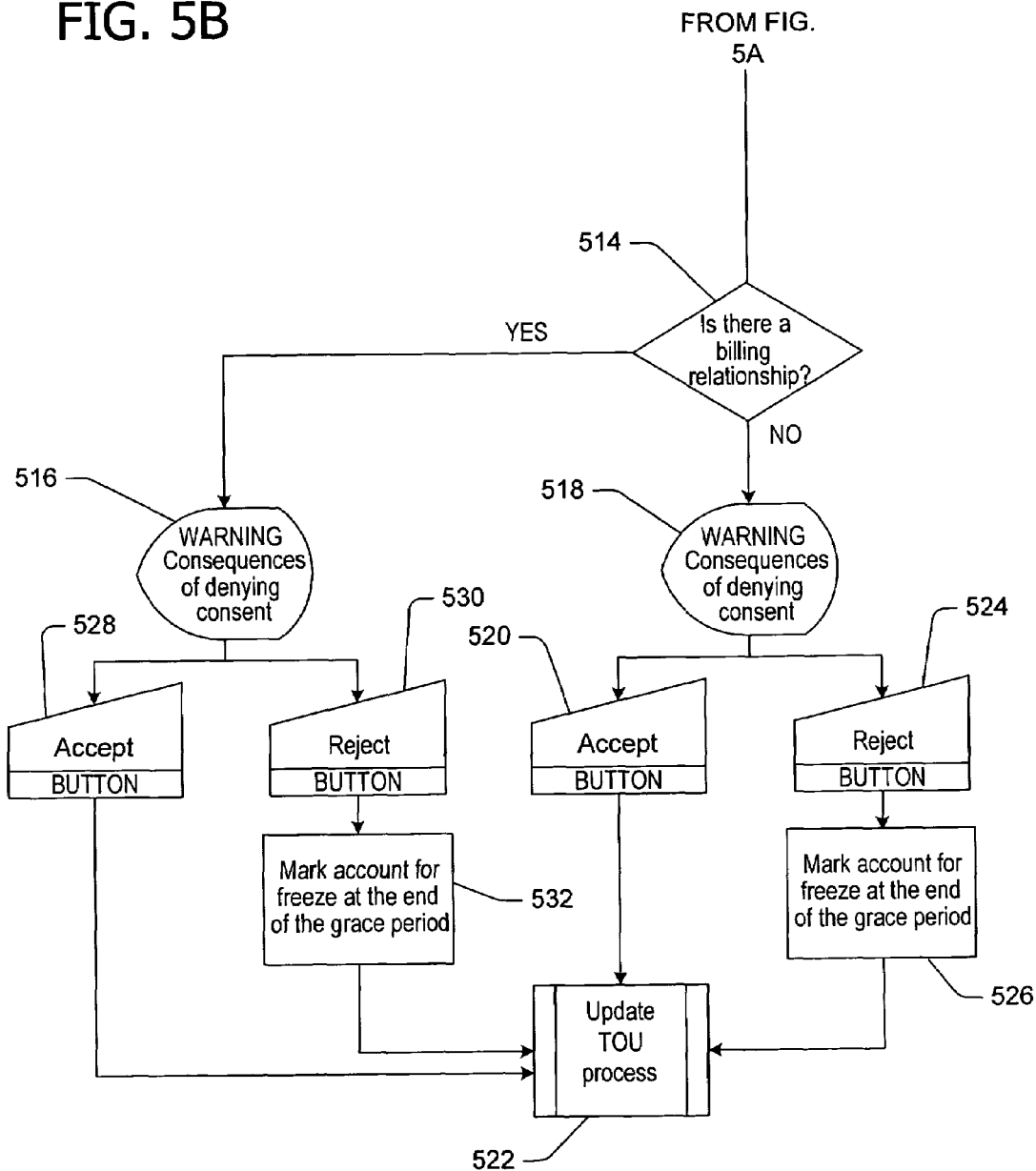

FIGS. 5A and 5B describe further aspects of an exemplary change notification and re-consent process in the form of a flow diagram. In this instance, the invention displays an initial user interface notifying the user when he or she signs in after expiration of the grace period for granting consent to the policy changes. The "past grace period" page is different than the one shown during the grace period. In FIGS. 5A and 5B, the UI informs the user that there has been a material change, provides additional information, and/or informs the user that continued use of the account will indicate consent.

In FIG. 5A, operations continue from a non-manager notification consent process at 502 (e.g., FIGS. 3A and 3B). As described further above, the user signs in from any sign-in point (e.g., Service A using an authentication system as described herein). Based on the user's unique identifier (e.g., a PUID), server 170 authenticates the user of client computer 162 seeking access to a particular one of the affiliate servers 166, namely, the network server providing Service A. When performing an authentication, server 170 first requests authenticating login information from the user, such as the user's login ID and password.

If the user is successfully authenticated and signed in, server 170 first determines that the user does not have a managed sign-in account. If the account is managed, re-consent is obtained from the manager. The invention in this example next determines which TOU version applies to the user and whether this version is current. If the TOU version to which the user last granted consent is not the most current, then server 170 checks if the user previously requested to never be notified of policy changes. When it is determined that the "Never Notify Me" option for silent consent is not taken, operations continue at 504. At 504, server 170 identifies whether the notification grace period is still in effect. If the grace period has expired, a change notification UI is exposed to the user at 506 to, for example, warn the user of the change to the privacy policy, provide a link to the privacy statement, provide notice to the user that inform the user that continued use by signing in will grant automatic consent, and/or provide the user with the ability to continue or discontinue the sign-in process.

If the user chooses "Continue" as shown at 508 in FIG. 5A, then the invention updates the TOU at 510. On the other hand, if the user chooses to discontinue the consent process at 512, then operations proceed to 514 in FIG. 5B to determine whether or not a billing relationship exists between the user and the service. For example, the invention displays a consequences page at either 516 or 518 depending on whether there is a billing relationship.

First, when a billing relationship does not exist, if the user chooses to accept the policy changes at 520, then the TOU is updated at 522. However, if the user chooses reject the new terms of use at 524, the account is marked to be deleted at 526. If deleted, the account in this example will be deleted the next time the delete daemon executes. If the user chooses to accept the policy changes at 528, then the TOU is updated at 522. On the other hand, if a billing relationship exists and the user chooses reject the new terms of use at 530, the account is marked to be frozen at 532.

Figure 6:
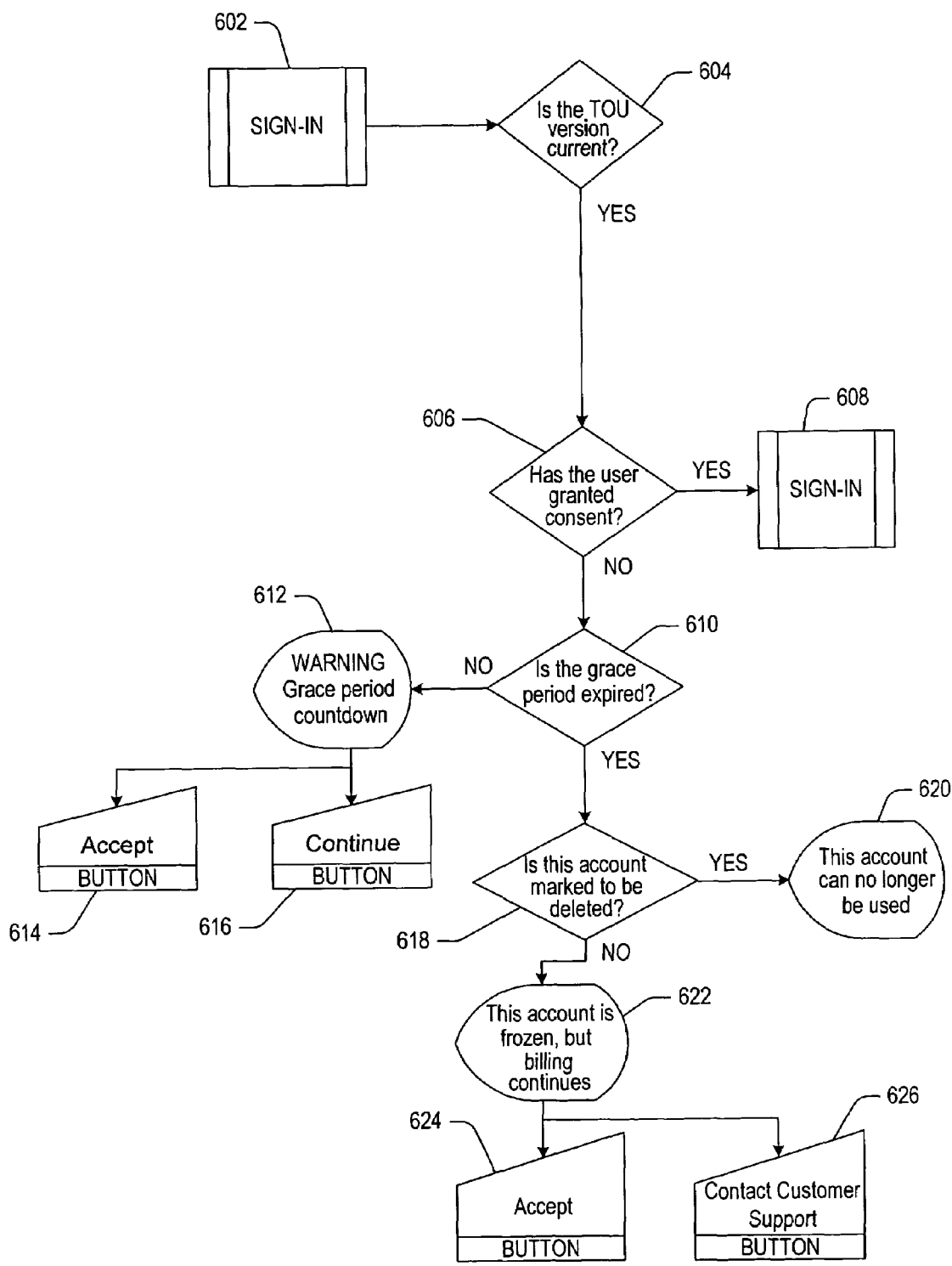
FIG. 6 is an exemplary flow diagram illustrating yet further aspects of process flow according to one embodiment of the invention.

Referring now to FIG. 6, the present invention contemplates subsequent sign-in processes. Once the user goes through the change notification process, the TOU is updated to the current version. This allows the user, even if he or she rejected consent, to continue signing in until the grace period ends. As such, the user who has rejected consent has an opportunity to subsequently grant consent. In one embodiment, the present invention displays a count-down page indicating how many days until the grace period ends.

The sign-in process (e.g., as described above) begins at 602. At 604, the invention in the illustrated embodiment determines if the TOU version associated with the user is current. If the account is not marked to be deleted or frozen (i.e., consent has been granted) as determined at 606, then the user proceeds to 608 where he or she is signed in and sent to the appropriate destination. On the other hand, if the account is marked to be deleted or frozen (i.e., consent has been rejected) as determined at 606, the invention determines at 610 whether the grace period is still in effect. If so, the invention in this example displays a page to the user at 612 indicating the number of days left in the grace period and then permits the user to either accept the new terms of use at 614 or reject the terms and continue at 616.

In FIG. 6, whether the user's account is marked at 618 to be deleted or frozen after expiration of the grace period determines which UI is displayed to the user. If marked for deletion, an appropriate UI at 620 informs the user that the grace period for policy change consent has expired, the account is marked for deletion, and that the account can no longer be used to sign in. The user is not signed in and is returned to the appropriate destination.

If the account is to be frozen because of a billing relationship, a UI at 622 informs the user of such. In particular, the UI in this example indicates that the policy change consent grace period has expired and the account can no longer be used to sign in. In contrast, the UI also informs the user that billing will continue. If the user chooses to accept at 624, the delete or freeze account marker is removed and the user is signed in. If the user chooses to merely continue at 626 without accepting the policy changes, the account status remains the same but the user is signed in. Further to the example, the user can also opt to contact customer support.

Figure 7B:
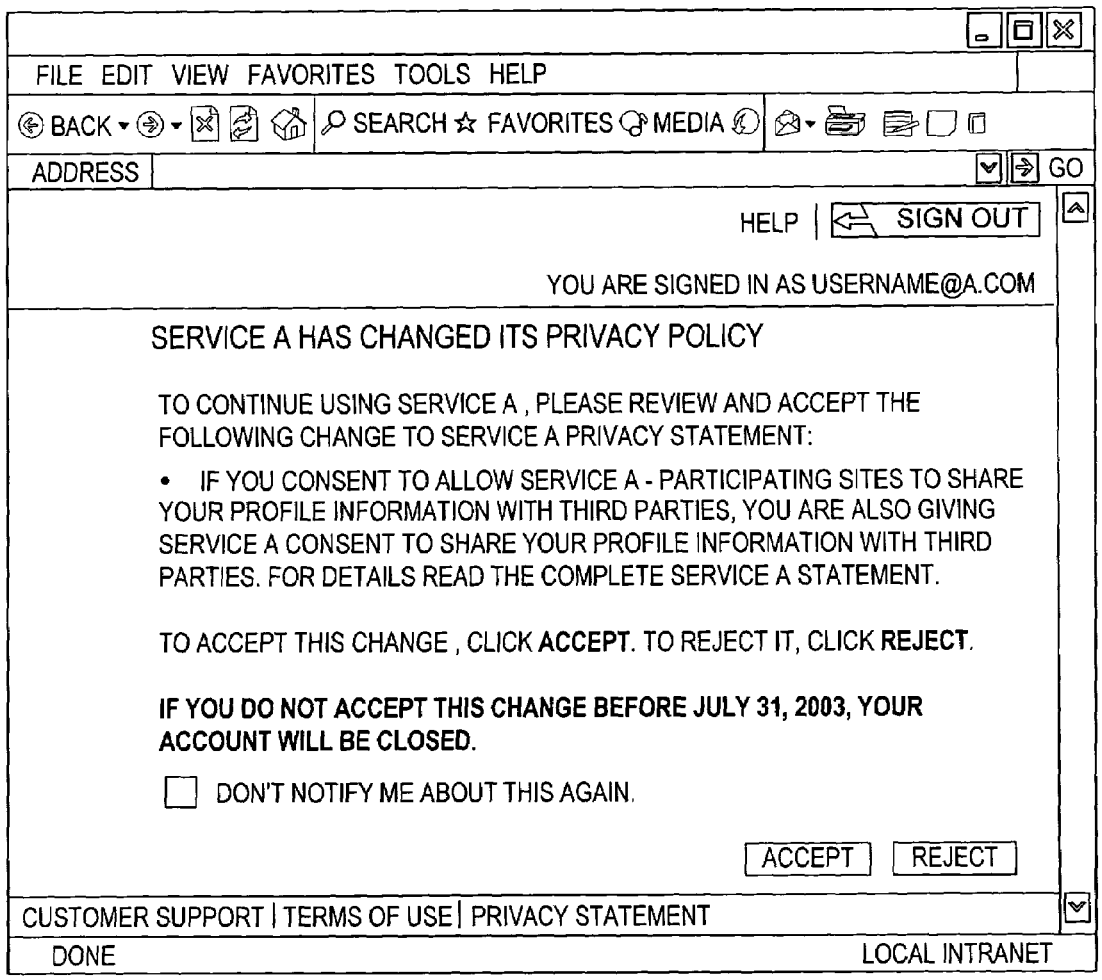
Figure 7C:
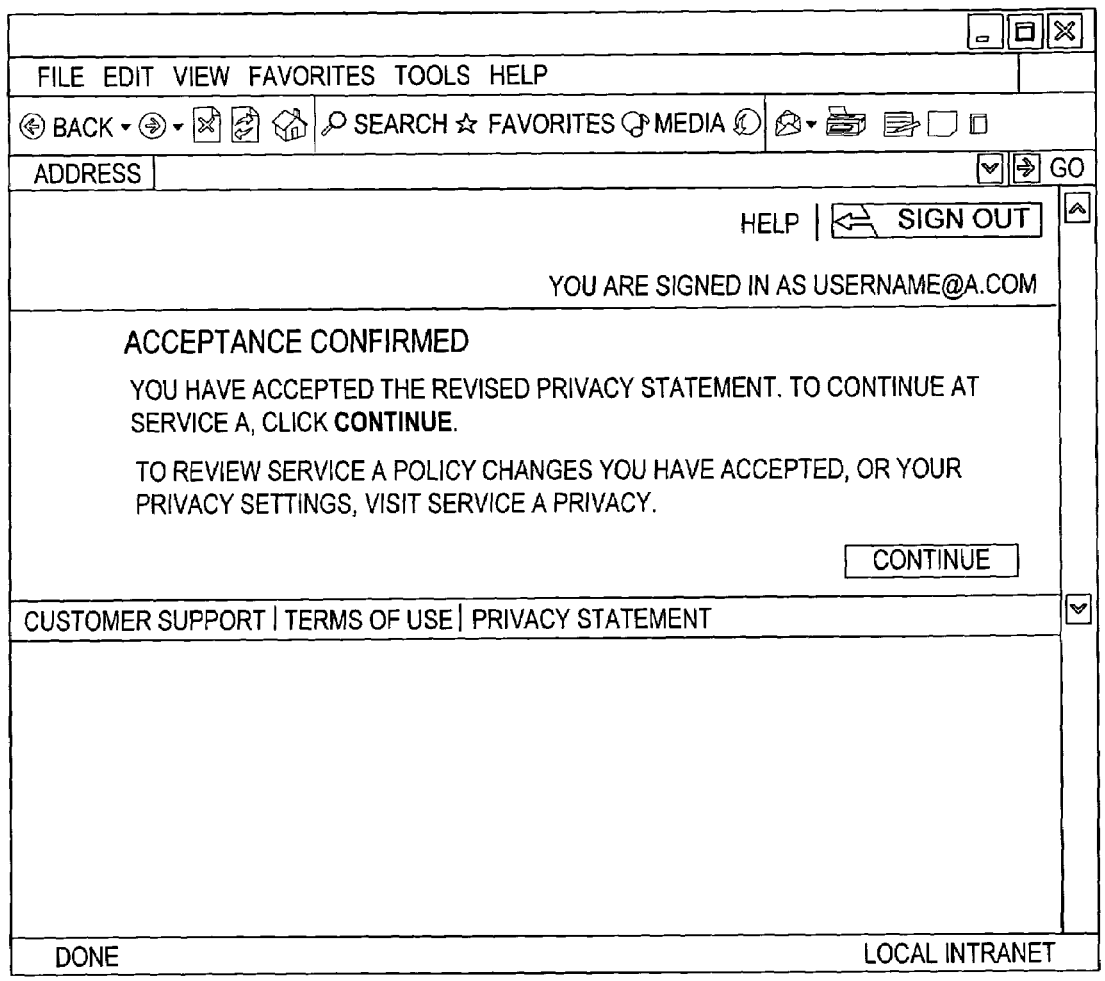
Figure 7D:
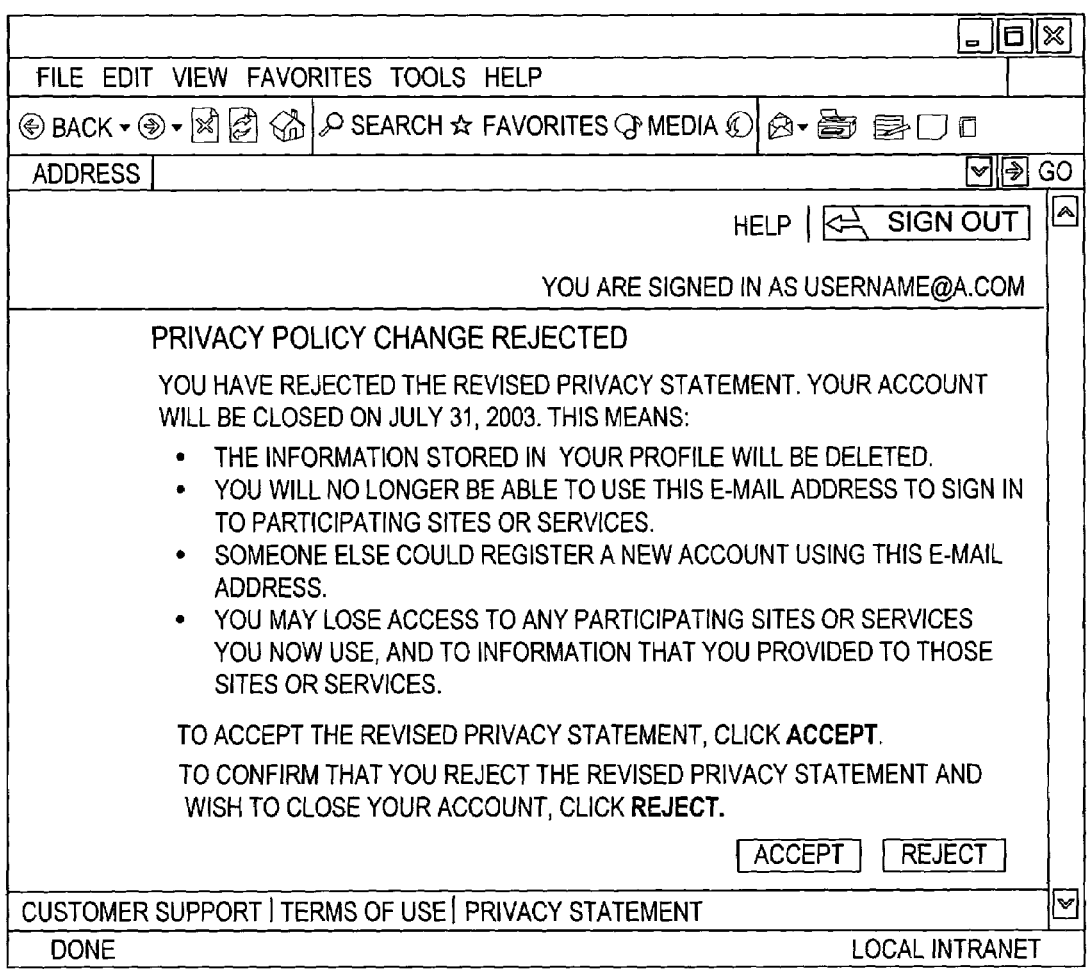
Figure 7E:
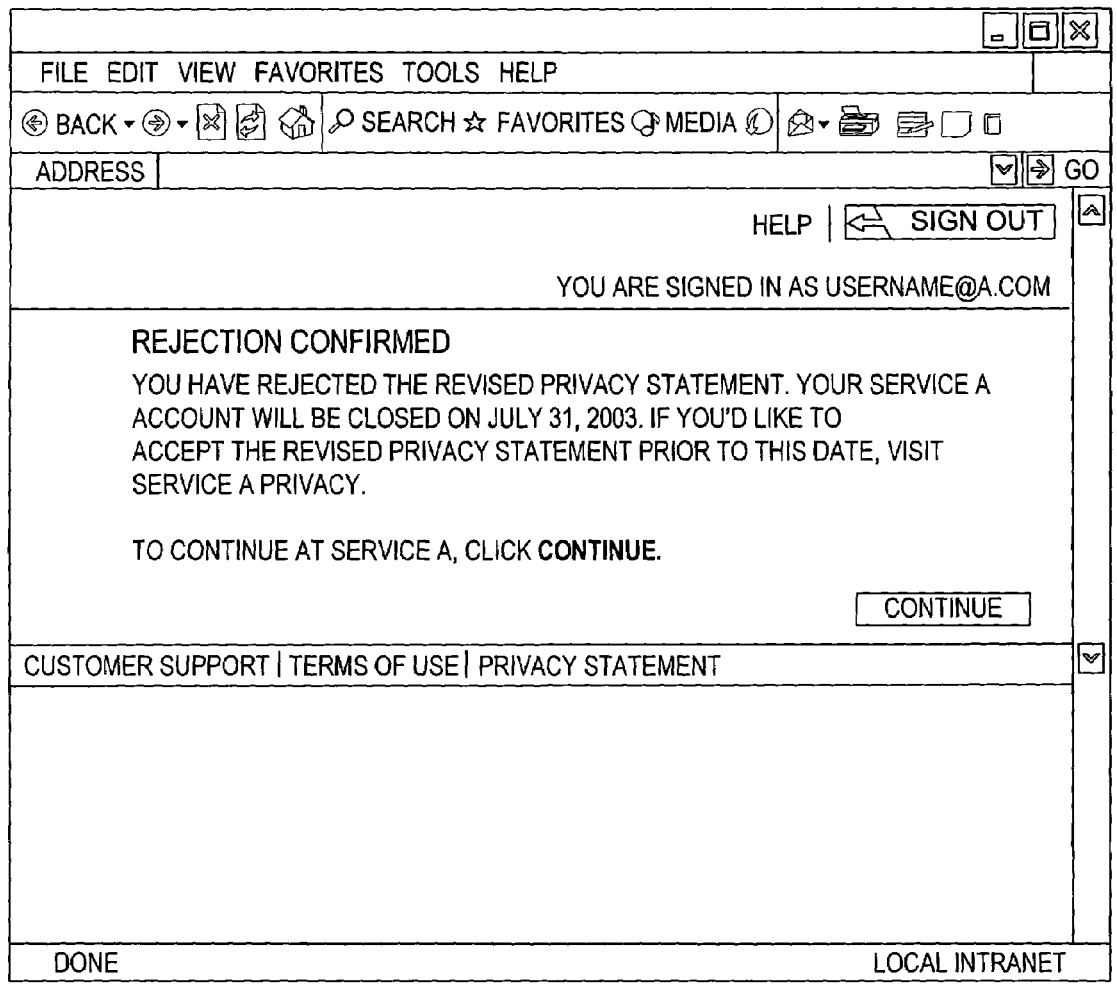

FIGS. 7A to 7E illustrate exemplary user interfaces for providing notice of policy changes and accepting re-consent. As shown in FIG. 7A, the UI in this example has a number of form fields for accepting information from the user. The form fields for information that is editable during first time consent are empty and can be filled in by the user. Further, the UI of FIG. 7A, as part of a first time consent process, provides an indication to the user whether the information will be shared. According to embodiments of the invention, a change notification UI such as shown in FIG. 7B provides the user with an opportunity to accept or reject the new terms of use. FIG. 7C illustrates an exemplary page for confirming acceptance. In contrast, FIG. 7D displays a warning to the user of the consequences of rejecting consent and FIG. 7E illustrates an example of a UI confirming that the user rejected the policy changes.

Figure 8:
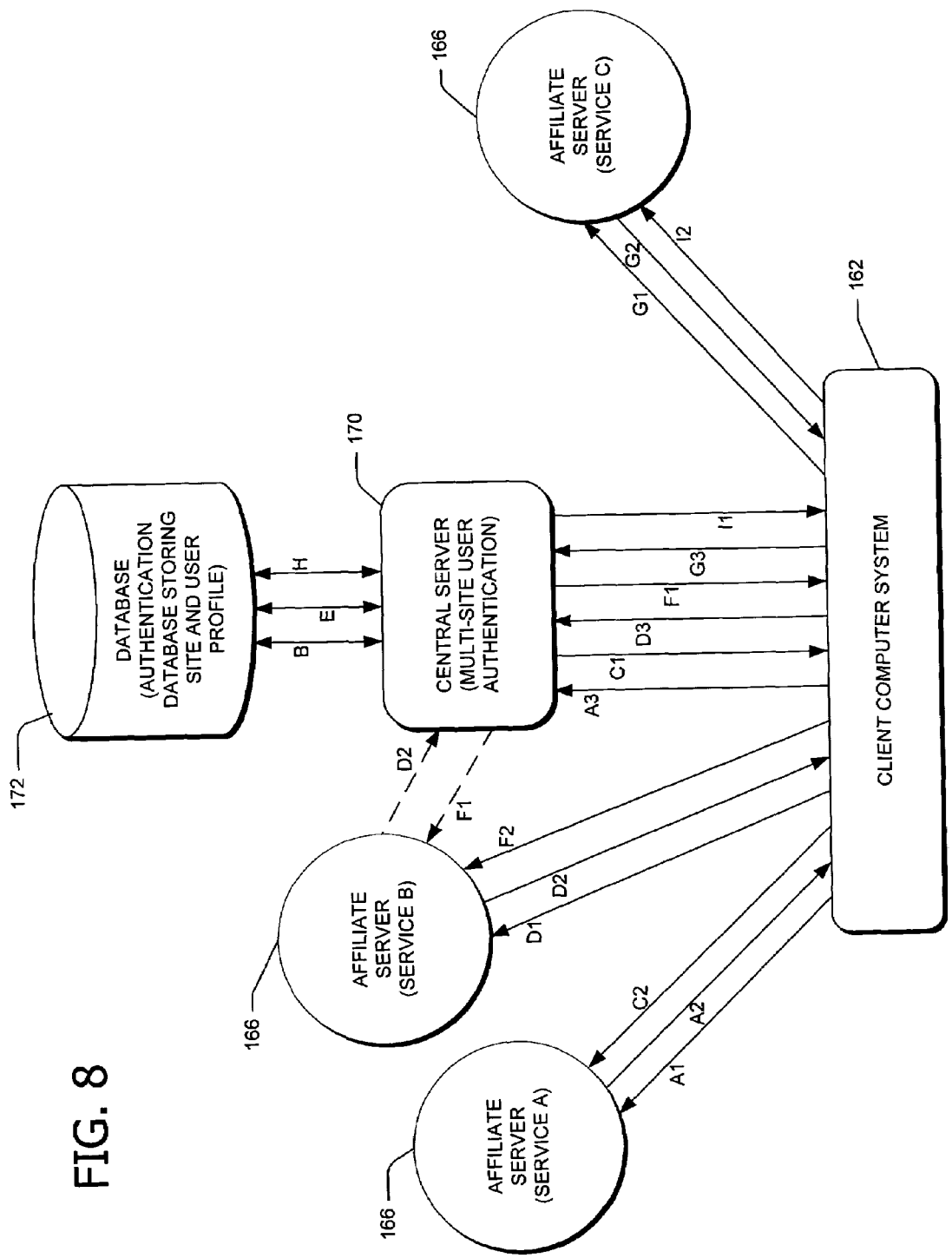
FIG. 8 is a block diagram illustrating an exemplary interaction between a client computer, affiliate servers, and a central server of FIG. 1.

FIG. 8 is an exemplary flow diagram illustrating an implementation of the present invention and the interaction between server 170, multiple client computer systems 162, and at least one affiliate server 166. The illustrated example of FIG. 8 describes the situation in which the user of client computer system 162 has not yet logged into affiliate server 166 and has not yet been registered or authenticated by server 170. The lines in FIG. 8 labeled "A" through "I" represent the flow of information or activities during the process. The arrows on the lines indicate the direction of the process flow. In this example, the label "A" represents the beginning of the processes and the label "I" represents the end of the process.

In the exemplary process flow of FIG. 8, Service A and Service B form one shared services group. Service A and Service C form another service group. Service A and Service B also share a common privacy policy and, thus, are in a policy group together. The user, shown at client computer 162, navigates to a first selected service, namely, Service A (see A1). As an example, Service A represents an Internet portal service to which the user is signing in for the first time. Central server 170 initiates sign-in and seeks first time consent from the user to disclose or use certain information in the user's profile (see A2/A3). The central server 170 also either stores the user's credentials for the first time or verifies the previously stored information (see B). Further, server 170 creates a ticket containing: (a) user profile information that the user has agreed to share with Service A; (b) operational information specific to Service A; and (c) operational information that is shared between Service A and Service B (e.g., the user's status as a premium subscriber to Service B's content). If the shared services groups are established ahead of time, the user is signed in to Service A (see C1/C2) with both Service A specific and Service B and Service C shared operational information. In this instance, FIG. 8 further represents the user's first time consent to the privacy policy of service A (see A2/A3).

When the user navigates to a content provider such as a Service B (see D1), server 170 silently authenticates the user (see D2/D3) inasmuch as the user is navigating within a shared services group. Moreover, Service A and Service B share a common privacy policy so that the user need not grant separate permission to Service B. In a similar manner, the server 170 as shown in FIG. 8 verifies the user (see E) and creates a ticket containing: (a) user profile information that the user has agreed to share with Service B; (b) operational information specific to Service B; and (c) operational information that is shared between Service A and Service B. Central server 170 permits the user to sign in to Service B (see F1/F2) with both Service B specific and Service A shared operational information. However, Service B does not have access to information in the client specific to Service A or shared by Service A and Service C. The user need not know that the system has routed him or her to another site because of the shared services and shared privacy policy arrangements.

In this exemplary process flow of FIG. 8, the user navigates to Service C (see G1) and is asked to re-authenticate (see G2/G3) because the immediately preceding site was in a different shared services group. As part of an authentication system, central server 170 verifies the user (see H) and creates a ticket containing: (a) user profile information that the user has agreed to share with Service C; (b) operational information specific to Service C; and (c) operational information that is shared between Service A and Service C. The server 170 signs in the user to Service C (see I1/I2) with both Service C specific and Service A shared operational information. As above, Service C does not have access to information specific to Service A or shared by Service A and Service B. In the event this is the user's first visit to Service C, the user will again have to go through a first time consent process because Service C is not in the policy group with Services A and B. Even if Service C belonged to the same service group as Services A and B, the consent process would be necessary because Service C employs a different privacy policy in this example.

FIG. 9 shows one example of a general purpose computing device in the form of a computer 70. In one embodiment of the invention, a computer such as the computer 70 is suitable for use in client computer system 162, central server 170, or any of affiliate servers 166.

In the illustrated embodiments, computer 70 has one or more processors or processing units 72 and a system memory 74. In the illustrated embodiment, a system bus 76 couples various system components including the system memory 74 to the processors 72. The bus 76 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 70 typically has at least some form of computer readable media. Computer readable media, which include both volatile and nonvolatile media, removable and non-removable media, may be any available medium that can be accessed by computer 70. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can accessed by computer 70. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 74 includes computer storage media in the form of removable and/or non-removable, volatile and/or nonvolatile memory. In the illustrated embodiment, system memory 74 includes read only memory (ROM) 78 and random access memory (RAM) 80. A basic input/output system 82 (BIOS), containing the basic routines that help to transfer information between elements within computer 70, such as during startup, is typically stored in ROM 78. The RAM 80 typically contains data and/or program modules that are immediately accessible to and/or presently being operated on by processing unit 72. By way of example, and not limitation, FIG. 9 illustrates operating system 84, application programs 86, other program modules 88, and program data 90.

The computer 70 may also include other removable/non-removable, volatile/nonvolatile computer storage media. For example, FIG. 9 illustrates a hard disk drive 94 that reads from or writes to non-removable, nonvolatile magnetic media. FIG. 9 also shows a magnetic disk drive 96 that reads from or writes to a removable, nonvolatile magnetic disk 98, and an optical disk drive 100 that reads from or writes to a removable, nonvolatile optical disk 102 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 84, and magnetic disk drive 96 and optical disk drive 100 are typically connected to the system bus 76 by a non-volatile memory interface, such as interface 106.

The drives or other mass storage devices and their associated computer storage media discussed above and illustrated in FIG. 9, provide storage of computer readable instructions, data structures, program modules and other data for the computer 70. In FIG. 9, for example, hard disk drive 94 is illustrated as storing operating system 110, application programs 112, other program modules 114, and program data 116. Note that these components can either be the same as or different from operating system 84, application programs 86, other program modules 88, and program data 90. Operating system 110, application programs 112, other program modules 114, and program data 116 are given different numbers here to illustrate that, at a minimum, they are different copies.

A user may enter commands and information into computer 70 through input devices or user interface selection devices such as a keyboard 120 and a pointing device 122 (e.g., a mouse, trackball, pen, or touch pad). Other input devices (not shown) may include a microphone, joystick, game pad, satellite dish, scanner, or the like. These and other input devices are connected to processing unit 72 through a user input interface 124 that is coupled to system bus 76, but may be connected by other interface and bus structures, such as a parallel port, game port, or a universal serial bus (USB). A monitor 128 or other type of display device is also connected to system bus 76 via an interface, such as a video interface 130. In addition to the monitor 128, computers often include other peripheral output devices (not shown) such as a printer and speakers, which may be connected through an output peripheral interface (not shown).

The computer 70 may operate in a networked environment using logical connections to one or more remote computers, such as a remote computer 134. The remote computer 134 may be a personal computer, a server, a router, a network PC, a peer device or other common network node, and typically includes many or all of the elements described above relative to computer 70. The logical connections depicted in FIG. 9 include a local area network (LAN) 136 and a wide area network (WAN) 138, but may also include other networks. LAN 136 and/or WAN 138 can be a wired network, a wireless network, a combination thereof, and so on. Such networking environments are commonplace in offices, enterprise-wide computer networks, intranets, and global computer networks (e.g., the Internet).

When used in a local area networking environment, computer 70 is connected to the LAN 136 through a network interface or adapter 140. When used in a wide area networking environment, computer 70 typically includes a modem 142 or other means for establishing communications over the WAN 138, such as the Internet. The modem 142, which may be internal or external, is connected to system bus 76 via the user input interface 134, or other appropriate mechanism. In a networked environment, program modules depicted relative to computer 70, or portions thereof, may be stored in a remote memory storage device (not shown). By way of example, and not limitation, FIG. 9 illustrates remote application programs 144 as residing on the memory device. It will be appreciated that the network connections shown are exemplary and other means of establishing a communications link between the computers may be used.

Generally, the data processors of computer 70 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described herein in conjunction with a microprocessor or other data processor. The invention also includes the computer itself when programmed according to the methods and techniques described below.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 70, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics including mobile phones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

In operation, computer 70 executes computer-executable instructions such as those described herein to establish permission to use information associated with a user. As an example, the invention establishes permission for managing consent between client 162 and at least one network affiliate server 166. The invention identifies the user in connection with an application or service that requests to use selected user profile information according to a predefined policy and defines a consent state associated with the identified user. The consent state directly corresponds to a version of the policy for which the user has granted permission for comparison with the version of the policy currently in use. In other words, by determining whether the user previously granted permission for the application to use the selected information according to the current policy, the invention can notify the user if a change has been made to the policy since the user previously granted permission to use the selected information. In one embodiment, the invention notifies the user of the policy change by providing a user interface via a browser.

Those skilled in the art will note that the order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

Information in this document, including uniform resource locator and other Internet web site references, is subject to change without notice. Unless otherwise noted, the example companies, organizations, products, domain names, e-mail addresses, logos, people, places and events depicted herein are fictitious, and no association with any real company, organization, product, domain name, e-mail address, logo, person, place or event is intended or should be inferred.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

Appendix A

Abby receives an e-mail in her inbox from her portal service (e.g., MSN®) network of Internet services). The e-mail states that the portal service has made a change to its privacy policy and that her consent to use information, which she has already provided, is required. Further to the example, the e-mail provides a link to the portal service's sign-in site. Abby chooses not to follow the link.

Later that day, Abby signs into an affiliated site using her account with a multi-site user authentication service (e.g., Microsoft®.NET™ Passport single sign-in service). During authentication, Abby is presented with a Privacy Consent page. The page explains the changes to the portal service's privacy policy and presents Abby with the option of accepting the new policy, denying the new policy, or canceling. In this example, Abby chooses to cancel and continues with her task.

The following week, Abby once again signs into the affiliated site using her sign-in service account and is presented with the Privacy Consent page. Abby is unsure about her next action because "canceling" last time did not make the page disappear. Abby therefore chooses "deny". In this instance, another page appears to warn Abby that by denying consent to the changes, she will be closing her portal service account. By canceling, Abby is now able to return to the consent page where she selects "grant consent" and returns to her task.

What is claimed is:

1. A method of establishing permission to use information associated with a user, said method comprising:
   identifying the user in connection with an application, said application requesting to use selected information associated with the user according to a predefined policy;
   determining whether permission was previously granted for the application to use the selected information according to the policy;

when permission was not previously granted for the application, seeking permission from the user for the application to use the selected information according to the policy;

when permission was previously granted for the application, determining whether one or more changes have been made to the policy since the permission was previously granted and whether the user should be notified of said changes; and notifying the user if determined that a change has been made to the policy since the permission was previously granted for the application and that the user is to be notified of said change.

2. The method of claim 1, wherein notifying the user comprises providing a user interface to inform the user of the change to the policy since the permission was previously granted for the application to use the selected information.

3. The method of claim 1, further comprising requesting consent to the change via the user interface.

4. The method of claim 3, further comprising denying use of the selected information by the application until consent to the change is granted in response to the user interface.

5. The method of claim 3, further comprising denying use of the selected information by the application if consent to the change is denied in response to the user interface.

6. The method of claim 3, wherein the identified user is associated with a managed account and wherein requesting consent to the change comprises requesting consent to the change from a manager of the account.

7. The method of claim 1, further comprising defining a consent state associated with the user, said consent state directly corresponding to a version of the policy for which the user has granted permission to the application to use the selected information.

8. The method of claim 7, further comprising maintaining a user profile associated with the user and storing the consent state in user profile.

9. The method of claim 7, further comprising identifying which version of the policy is currently in use for the application and determining when the version of the policy corresponding to the consent state is different from the version of the policy currently in use for the application.

10. The method of claim 9, wherein notifying the user of the change to the policy is responsive to determining when the version of the policy corresponding to the consent state is different from the version of the policy currently in use for the application.

11. The method of claim 7, wherein identifying the user comprises receiving login information from the user and authenticating the user based on the received login information.

12. The method of claim 10, wherein authenticating the user comprises associating a unique identifier with the user.

13. The method of claim 12, further comprising associating the unique identifier for the user to the consent state associated with the user.

14. The method of claim 1, further comprising storing information representative of which version of the policy is current.

15. The method of claim 1, further comprising storing content of the change to the policy relative to a version of the policy.

16. The method of claim 1, further comprising maintaining a notification store containing information representative of one or more of the following: a grace period for granting consent to the change to the policy; content of the change to the policy relative to a version of the policy; and a current version number of the policy.

17. The method of claim 1, wherein the application comprises a web service provided to the user via a client by one or more network servers, said client and network servers being coupled to a data communication network.

18. The method of claim 17, further comprising managing use of the selected information as a function of whether the user has a relationship with another web service.

19. The method of claim 17, further comprising storing, in a central database, a user profile containing the information associated with the user, said central database being associated with a central server coupled to the data communication network.

20. The method of claim 17, wherein the client operates a browser configured to permit the user to communicate on the data communication network, and wherein notifying the user comprises providing a user interface via the browser to inform the user of the change to the policy and to request re-consent.

21. The method of claim 17 wherein the network servers are web servers and the data communication network is the Internet.

22. One or more computer-readable storage media have computer-executable instructions for performing the method of claim 1.

23. A method of managing consent between a client and at least one network server, said client and said network server being coupled to a data communication network, said network server providing one or more services to a user via the client, said client operating a browser configured to permit the user to communicate on the data communication network, said method comprising:

identifying the user in connection with the network server, said network server requesting to use selected information associated with the user according to a predefined policy;

defining a consent state associated with the identified user, said consent state directly corresponding to a version of the policy for which permission has been granted for the network server to use the selected information;

identifying which version of the policy is currently in use for the network server;

determining whether the user has requested notification of a change in the policy version wherein the version of the policy corresponding to the consent state is different from the version of the policy currently in use for the network server; and providing a user interface via the browser to notify the user of the change in the policy version in response to determining that the user has requested the notification.

24. The method of claim 23, wherein the user interface is provided by a central server also coupled to the data communication network.

25. The method of claim 23, further comprising notifying the user of one or more differences between the version of the policy corresponding to the consent state and the version of the policy currently in use for the network server.

26. The method of claim 23, further comprising requesting consent to the version of the policy currently in use for the network server via the user interface.

27. The method of claim 26, further comprising denying use of the selected information by the network server until the consent is granted in response to the user interface.

28. The method of claim 26, further comprising denying use of the selected information by the network server if the consent is denied in response to the user interface.

29. The method of claim 26, wherein the identified user is associated with a managed account and wherein requesting consent to the version of the policy currently in use comprises requesting consent from a manager of the account.

30. The method of claim 23, further comprising maintaining a user profile associated with the user and storing the consent state in user profile.

31. The method of claim 23, further comprising storing content of a change to the policy corresponding to the consent state relative to the version of the policy currently in use for the network server.

32. The method of claim 23, further comprising maintaining a notification store containing information representative of one or more of the following: a grace period for granting consent to the change to the policy; content of a change to the policy relative to a later version of the policy; and a current version number of the policy.

33. The method of claim 23, further comprising managing use of the selected information as a function of whether the user has a relationship with another service.

34. The method of claim 23, further comprising storing, in a central database, a user profile containing the information associated with the user, said central database being associated with a central server coupled to the data communication network.

35. The method of claim 34 wherein the central server is an authentication server of a multi-site user authentication system and the network servers are affiliated with the authentication server, said authentication server receiving requests to authenticate the user when the user requests the web service to be provided by one or more of the affiliated network servers.

36. The method of claim 23, wherein the network servers are web servers and the data communication network is the Internet.

37. One or more computer-readable storage media have computer-executable instructions for performing the method of claim 23.

38. An authentication system comprising:
an authentication server coupled to a data communication network;
an authentication database associated with the authentication server, said authentication database storing authentication information for comparison to login information provided by a user for authenticating the user, said authentication database further storing user-specific information identifying the user with respect to one or more services provided by at least one affiliate server coupled to the data communication network, said affiliate server providing the one or more services to the user via a client coupled to the data communication network and requesting to use selected information associated with the user according to a predefined policy;
said authentication server being configured to identify which version of the policy is currently in use for the affiliate server, to determine whether user has requested notification of policy version changes, and to provide a user interface for notifying the user when the version of the policy currently in use is different from a policy under which the user previously granted permission for the affiliate server to use the selected information and the user has requested notification of the policy version changes.

39. The system of claim 38, further comprising a notification store containing information representative of one or more of the following: a grace period for the user to consent to the change to the policy; content of a change to the policy relative to a later version of the policy; and a current version number of the policy.

40. The system of claim 38, wherein the user interface provided by the authentication server further displays a user-selectable option for requesting consent from the user for the version of the policy currently in use for the affiliate server.

41. The system of claim 38, wherein the affiliate server is a web server and the data communication network is the Internet.

42. One or more computer-readable storage media having computer-executable components for managing consent between a client and at least one network server, said client and said network server being coupled to a data communication network, said network server providing one or more services to a user via the client and requesting to use selected information associated with the user according to a predefined policy, said tangible computer-readable media comprising:
an authentication component for authenticating the user and for identifying which version of the policy is currently in use for the network server;
a profiling component for determining whether the user previously granted permission for the network server to use the selected information and for retrieving a consent state associated with the user, said consent state directly corresponding to a version of the policy for which the user has previously granted permission for the network server to use the selected information; and
a re-consent component for determining whether the user has requested notification of policy version changes and notifying the user according to said request of one or more changes between the version of the policy currently in use for the network server and the version of the policy associated with the consent state and for requesting consent to the changes from the user.

43. The computer-readable storage media of claim 42, further comprising a user profile store containing information associated with the user and wherein the central server is responsive to the profiling component for retrieving the consent state associated with the user from the user profile store.

44. The computer-readable storage media of claim 42, wherein the re-consent component comprises an interface component for providing a user interface to the user via the client.

45. The computer-readable storage media of claim 42, further comprising a notification store containing information representative of one or more of the following: a grace period for the user to consent to the change to the policy; content of the change to the policy relative to a version of the policy; and a current version number of the policy.

* * * * *